US012729796B2

(12) United States Patent
Poe et al.

(10) Patent No.: US 12,729,796 B2
(45) Date of Patent: Sep. 8, 2026

(54) SINGLE OR MULTI-DUROMETER ELASTOMER, SELF-ACTUATING, DYNAMIC, STRESS SUPPRESSOR FOR HOT TAPPING TOOLS

(71) Applicant: TDW Delaware, Inc., Wilmington, DE (US)

(72) Inventors: Roger L. Poe, Beggs, OK (US); Jon Maslen, Sand Springs, OK (US); Qi Li, Houston, TX (US); Kolton Landreth, Jenks, OK (US)

(73) Assignee: TDW Delaware, Inc., Wilmington, DE (US)

( * ) Notice: Subject to any disclaimer, the term of this patent is extended or adjusted under 35 U.S.C. 154(b) by 664 days.

(21) Appl. No.: 18/178,075

(22) Filed: Mar. 3, 2023

(65) Prior Publication Data

US 2023/0279980 A1 Sep. 7, 2023

Related U.S. Application Data

(60) Provisional application No. 63/316,773, filed on Mar. 4, 2022.

(51) Int. Cl.
*F16L 55/124* (2006.01)
*F16L 55/105* (2006.01)
(Continued)

(52) U.S. Cl.
CPC ......... *F16L 55/124* (2013.01); *F16L 55/1141* (2013.01); *F16L 55/132* (2013.01);
(Continued)

(58) Field of Classification Search
CPC ....... F16F 2230/007; F16K 3/28; F16L 47/34; F16L 47/345; F16L 55/105; F16L 55/11;
(Continued)

(56) References Cited

U.S. PATENT DOCUMENTS 2,780,244 A * 2/1957 Lee ...................... F16L 55/105 138/94
2,812,778 A * 11/1957 Ver Nooy ............ F16L 55/105 138/94

(Continued)

FOREIGN PATENT DOCUMENTS

CN 2630617 Y * 8/2004
KR 101345356 B1 * 1/2014 ........... F16L 55/105

*Primary Examiner* — Kenneth Rinehart
*Assistant Examiner* — Richard K. Durden
(74) *Attorney, Agent, or Firm* — GableGotwals

(57) ABSTRACT

Embodiments of a plugging tool (10) of this disclosure a control bar head (20) and at least one sealing head (30, 40) pivotally connected to the control bar head, the control bar head including a stress suppressor (50) located at a lower end (25) of the control bar head, the stress suppressor including an elastomeric element (51). The stress suppressor can act as a dual-stage suppressor, there being a primary (first stage) and a secondary (second stage) stress suppressor or zone (50A, 50B). The primary stress suppressor has an arched-shaped lowermost end (58) located between a pair of spaced-apart feet (21) of the control bar head, the feet having lateral edges (23) and comprising the secondary stress suppressor. During rotation of the tool into the pipe, stress to the pipe is reduced in a range of 5X to 14X relative to a plugging tool without the stress suppressor.

15 Claims, 7 Drawing Sheets

Figure 1:
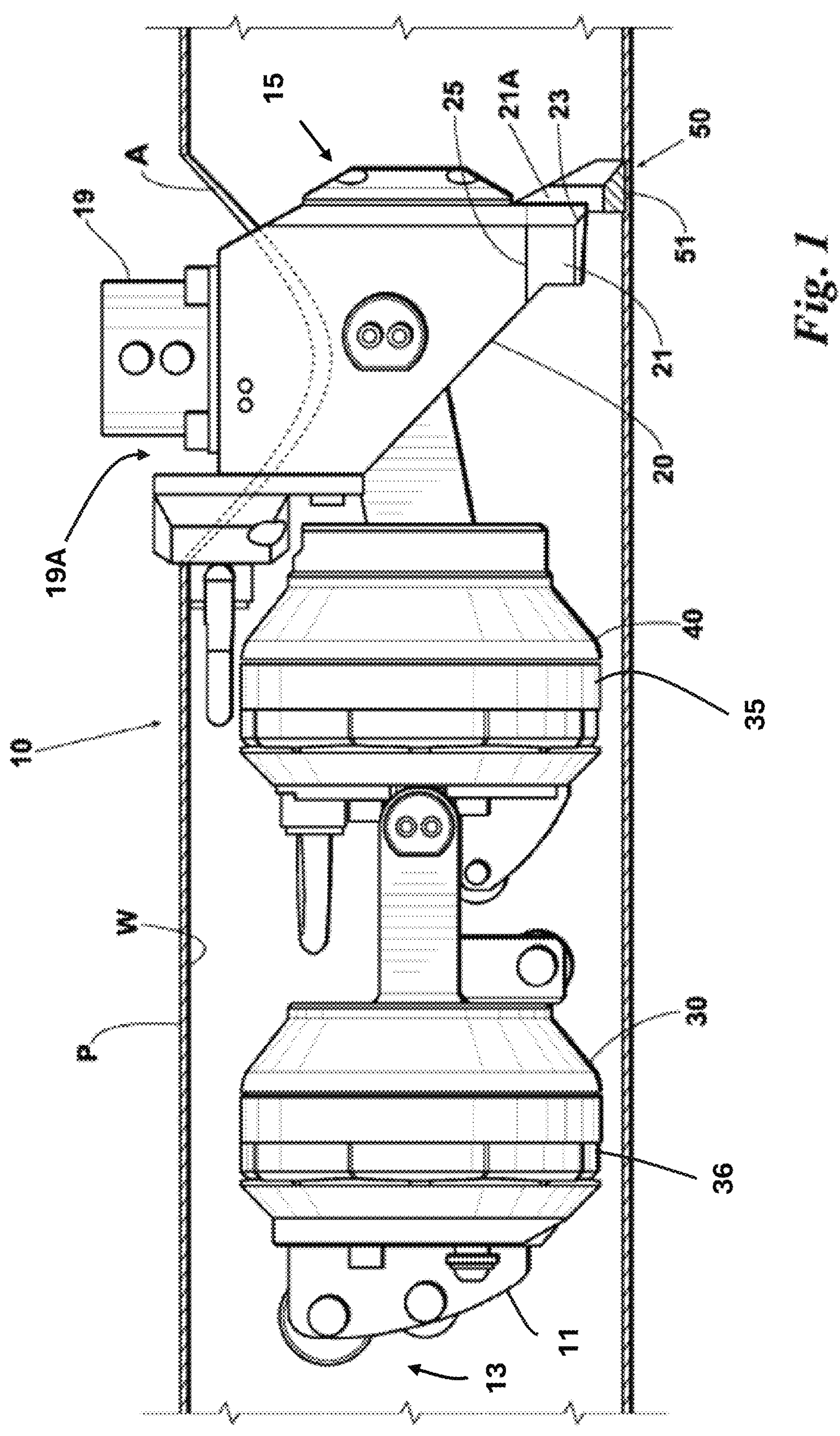

(51) Int. Cl.
*F16L 55/11* (2006.01)
*F16L 55/132* (2006.01)
*F16L 57/02* (2006.01)
*F16L 41/04* (2006.01)

(52) U.S. Cl.
CPC ............... *F16L 57/02* (2013.01); *F16L 41/04* (2013.01); *F16L 55/105* (2013.01)

(58) Field of Classification Search
CPC ... F16L 55/1141; F16L 55/124; F16L 55/132; F16L 55/136
USPC ............................................ 138/94; 267/140
See application file for complete search history.

(56) References Cited

U.S. PATENT DOCUMENTS

| | | | | | |
|---|---|---|---|---|---|
| 2,913,012 | A * | 11/1959 | McCurley | F16L 55/105 | 251/191 |
| 3,025,885 | A * | 3/1962 | Ver Nooy | F16L 55/105 | 138/94 |
| 3,039,757 | A * | 6/1962 | Barr | F16F 1/40 | 267/140 |
| 3,480,268 | A * | 11/1969 | Fishbaugh | F16F 1/40 | 267/209 |
| 3,539,173 | A * | 11/1970 | Sampson | F16F 1/36 | 267/140 |
| 4,754,958 | A * | 7/1988 | Markowski | F16F 1/40 | 267/141.1 |
| 5,082,026 | A | 1/1992 | Smith | | |
| 6,283,446 | B1 * | 9/2001 | Sato | F16K 3/28 | 251/193 |
| 6,810,903 | B1 * | 11/2004 | Murphy | F16L 55/124 | 29/213.1 |
| 9,644,779 | B2 * | 5/2017 | Vazzana | F16L 55/11 | |
| 12,359,762 | B2 * | 7/2025 | Parsley | F16L 55/132 | |
| 2010/0007069 | A1 * | 1/2010 | Kawada | F16F 1/406 | 264/261 |
| 2013/0319542 | A1 * | 12/2013 | Ries | F16L 55/105 | 137/15.23 |
| 2016/0033071 | A1 * | 2/2016 | Ravetti | F16L 55/124 | 138/93 |
| 2019/0186640 | A1 * | 6/2019 | Vazzana | F16L 55/124 | |
| 2019/0390814 | A1 | 12/2019 | McKone et al. | | |
| 2020/0309308 | A1 * | 10/2020 | Naber | F16L 55/1141 | |
| 2022/0299149 | A1 * | 9/2022 | Naber | F16L 55/105 | |

* cited by examiner 57
60
25
21
20
19

SF < 1
Fx
50
SF > 1
Fx
50

53
Fc
51
55

Fc
53
51

Fc
53
51

SINGLE OR MULTI-DUROMETER ELASTOMER, SELF-ACTUATING, DYNAMIC, STRESS SUPPRESSOR FOR HOT TAPPING TOOLS

CROSS-REFERENCE TO CO-PENDING APPLICATIONS

This application claims priority to, and the benefit of, U.S. 63/316,773 filed Mar. 4, 2022, the content of which is fully incorporated by reference herein.

BACKGROUND

This disclosure is in the field of hot tapping systems and methods wherein an interior of a section of pipeline is accessed by creating a lateral access connection to the pipeline while under pressure and transporting pipeline product. More particularly, the disclosure relates to plugging equipment associated with a hot tapping operation.

Steel pipelines are used to collect, distribute, transport, or store collective media such as gases or liquids under pressure. In many cases these gases and liquids are highly flammable and or explosive in nature. The gases can also be poisonous and or non-breathable asphyxiants capable of causing injury or death upon escaping the pipeline. Many of these steel pipelines were built with very thin walls; designed to handle the pressures when installed. Over time, these pipes have oxidized and corroded to the point where excessive forces over a small area could lead to yielding or deformation of the pipeline wall, if not failure. For example, in areas around the world and especially in Europe where pipelines carrying gas have been in use for up to 45 years, there are lines currently in use that can have wall thicknesses well under 3.35 mm (0.131 in).

When a section of steel pipeline requires service, hot tapping may be used with a T-fitting connected to the pipeline. A plugging tool having sealing heads is inserted mechanically through the T-fitting and into position within the pipe as the foot of the tool contacts the bottom of the curved surface of the inside diameter of the pipe. The mechanical advantage of the tool is significant, allowing the footing of the inserted tool to produce several thousand pounds of force against the pipeline wall. The load or force at the foot of the plugging equipment is a function of the mechanical advantage of the actuator and the interaction of the mechanical force used to position the tool.

When the pipeline wall is less than a typical schedule 40 pipe, this applied force can result in a failure to the line and, in turn, escaping gases and liquids. Gas companies have been attempting to find a tool to work under these thin wall conditions for several years that would not require banding, welding, or secondary containment. In some applications, the thin wall pipe comprises oxidized schedule 10 or oxidized schedule 5 or 5XS pipe. Therefore, a need exists for hot tapping tools that produce a greatly diminished stress gradient within the pipe during their insertion and use.

SUMMARY

Embodiments of a pipeline isolation or plugging tool of this disclosure are adapted for insertion into a lateral access connection to a pipe, the plugging tool including a control bar head and at least one sealing head pivotally connected to the control bar head, the control bar head including a stress suppressor located at a lower end of the control bar head, the stress suppressor including an elastomeric element. The stress suppressor can include a primary suppressor and a secondary suppressor, the primary suppressor redistributing forces in an axial direction of the pipe, the secondary suppressor redistributing the forces in a radial direction. In embodiments, a two-stage suppression process occurs, the primary suppressor contacting the pipe wall first followed by the secondary suppressor. In this way, the suppressor is a dual-stage suppressor. As the applied force increases, the primary suppressor lengthens axially and the secondary suppressor widens radially.

In embodiments, the primary suppressor may have an arched-shaped lowermost end located between a pair of spaced-apart feet or legs at the lower end of the control bar head, the pair of spaced feet being the secondary suppressor. The arch should be complementary to the pipe curvature. The primary stress suppressor may have a length greater than that of the feet such that the primary stress suppressor contacts the inner wall of the pipe prior to the feet contacting the inner wall. The pair of spaced-apart feet may include curved lateral edges with the stress suppressor covering the curved lateral edges. The curved lateral edges should be complementary to the pipe curvature.

The elastomeric element may be a dual durometer elastomeric element and may include at least one non-elastomeric element arranged adjacent the elastomeric element. The at least one non-elastomeric element and the elastomeric element can be arranged as a stack.

Embodiments of a method for redistributing the applied force to an inner wall of a pipe during an isolation of the pipe includes lowering a plugging tool of this disclosure into a lateral access connection to the pipe; rotating at least one sealing head into a position for sealing against the inner wall; and during at least a portion of the rotating, suppressing stress experienced by the inner wall by compressing the elastomeric element against the inner wall.

DRAWINGS

FIG. 1 is a side view of an embodiment of a plugging head assembly of this disclosure that includes a stress suppressor located at the lowermost end the control bar head. The plugging head assembly is shown here after its two sealing heads have been articulated into the pipeline and positioned 90° to the T-fitting. In this view the control bar head and the stress suppressor is shown in the way in which the tool will interact with the interior wall of the pipeline system into which it will be deployed. In embodiments, the stress suppressor comprises an elastomer that compresses in all dimensions and directions (axially and radially), thereby making the suppressor "self-actuating" as the elastomer conforms to the pipe wall. For purposes of this disclosure, self-actuating means that no external means are required for its actuation, the suppressor actuating on its own as the tool contacts the pipe wall. The suppressor is also dynamic as the elastomer compresses in response to the pipe wall. The stress suppressor may include a stack of elastomeric and non-elastomeric elements.

Figure 2:
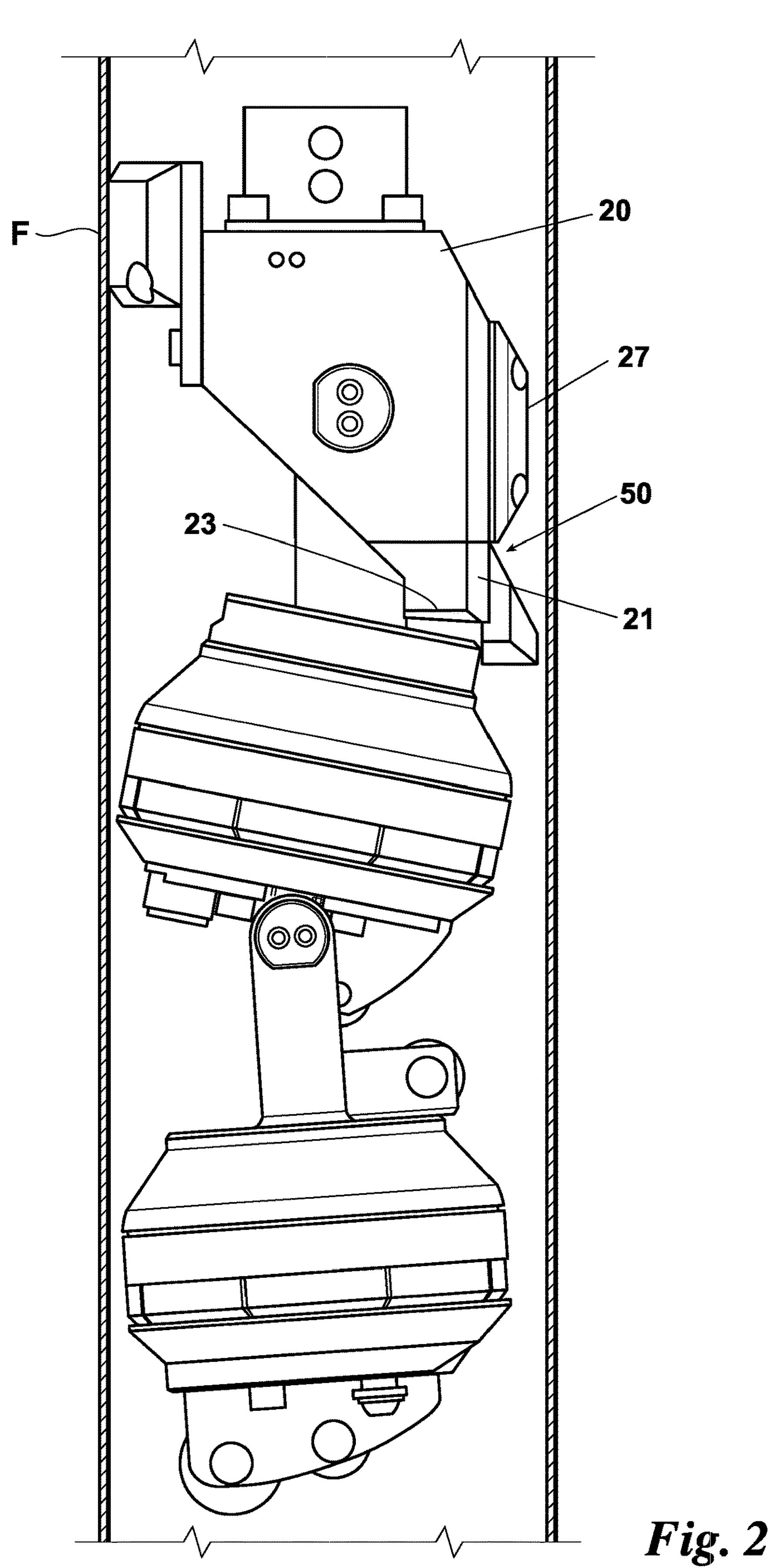

FIG. 2 is a side view of an embodiment of the tool hanging in the housing ready to be deployed. The suppressor is within the confines of the tool as it travels vertically downward through the T-fitting. As the tool is deployed into the interior of the pipe, the lower section will come into contact and roll through the 90-degree bend. A significant amount of force will be applied to the nose piece on the secondary head to cause it to move into the lateral piping sections. When the tool is finally at rest inside the pipeline a lower portion of the control bar head will be resting on the curved inner surface of the pipeline proper. At this point the tool will establish a significant force to the pipeline wall. The elastic capability of the suppressor will absorb much of this stress and distribute it over the inside wall of the pipe to eliminate deformation to the pipe.

Figure 3:
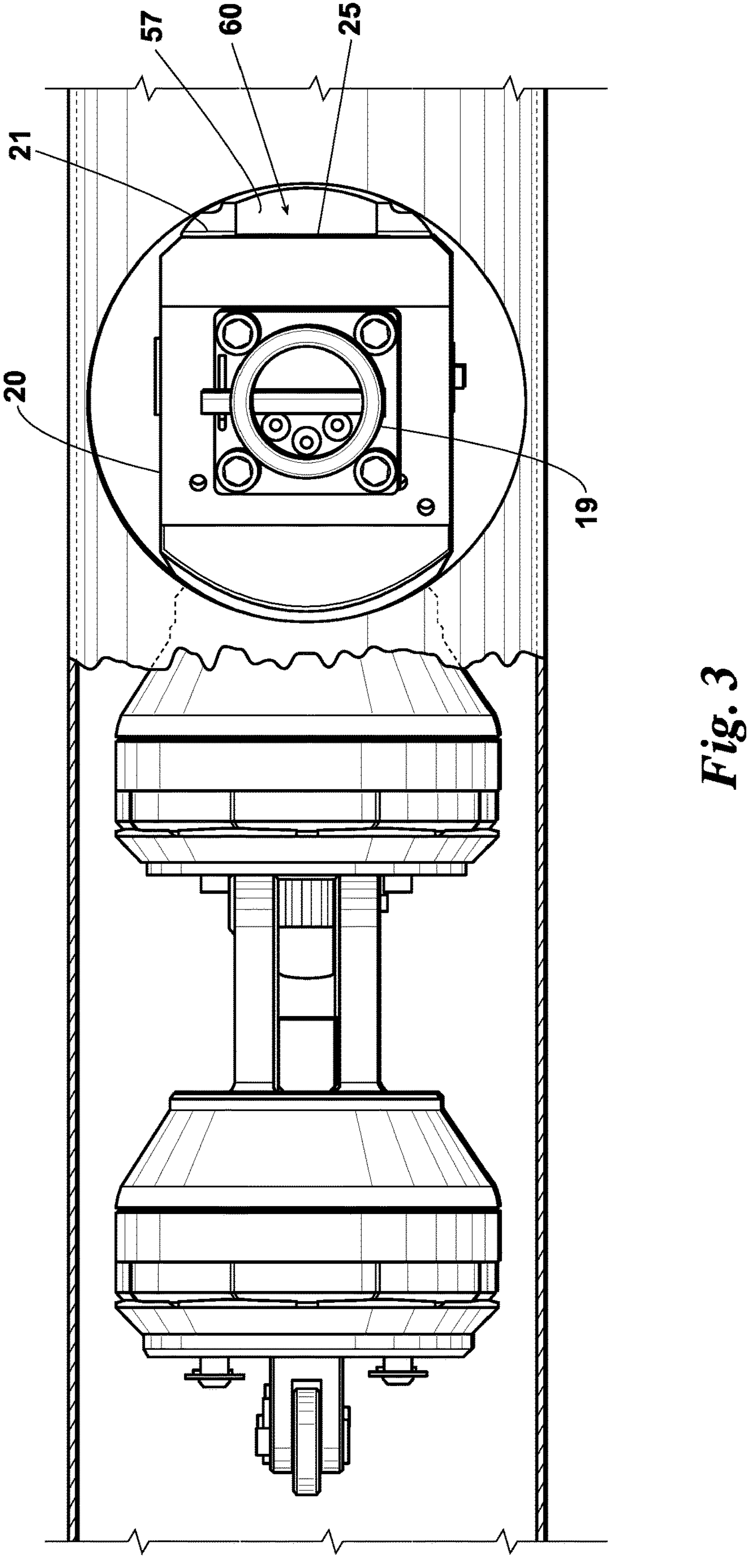

FIG. 3 is a top view looking down into the pipeline from the control bar head as the tool is out of the fitting where the connection to the pipeline is made and rotated into the pipeline proper, the sealing heads pushed into the pipeline at a 90° angle to the fitting. This figure shows the control bar head and how the suppressor is integrated into the framework of the tool such that it is compact and has no capacity to detract to the tool from inserting and detracting.

Figure 4:
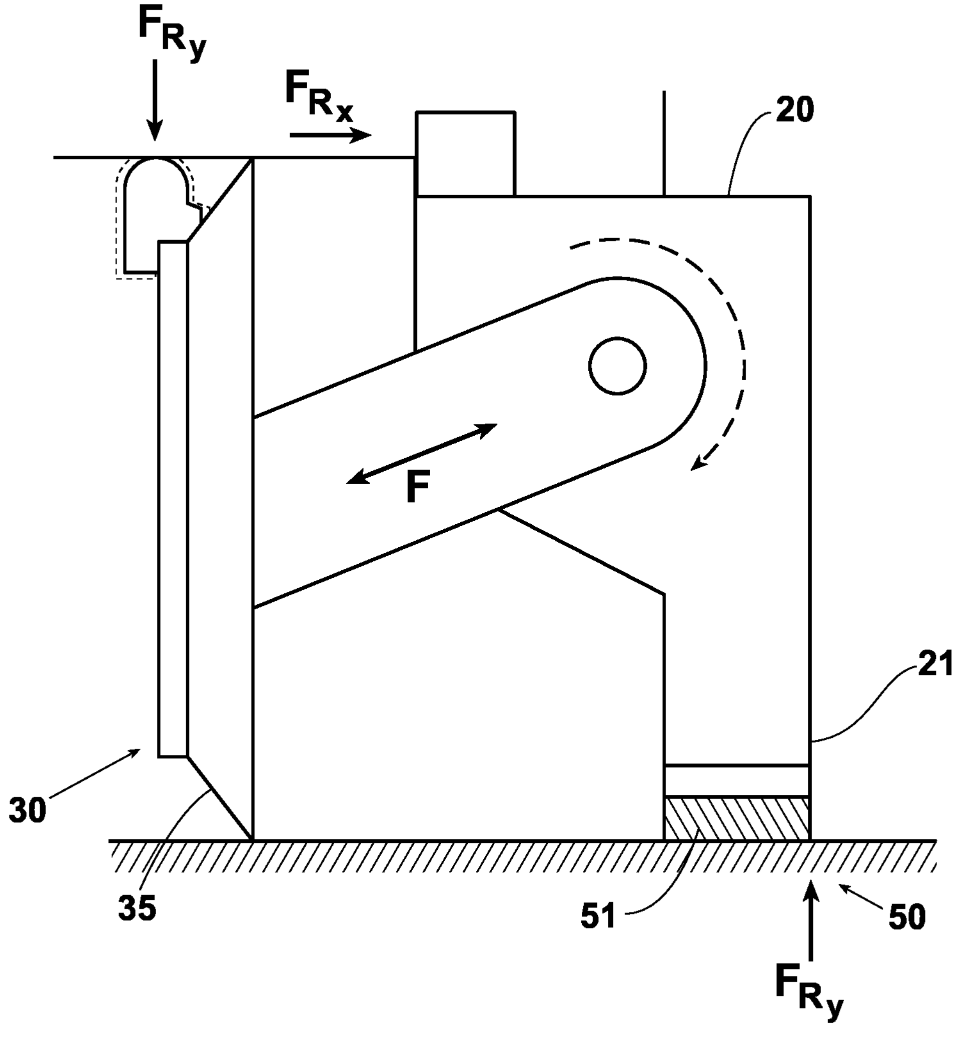
Figures 5A, 5B, 5C, 5D, 5E:
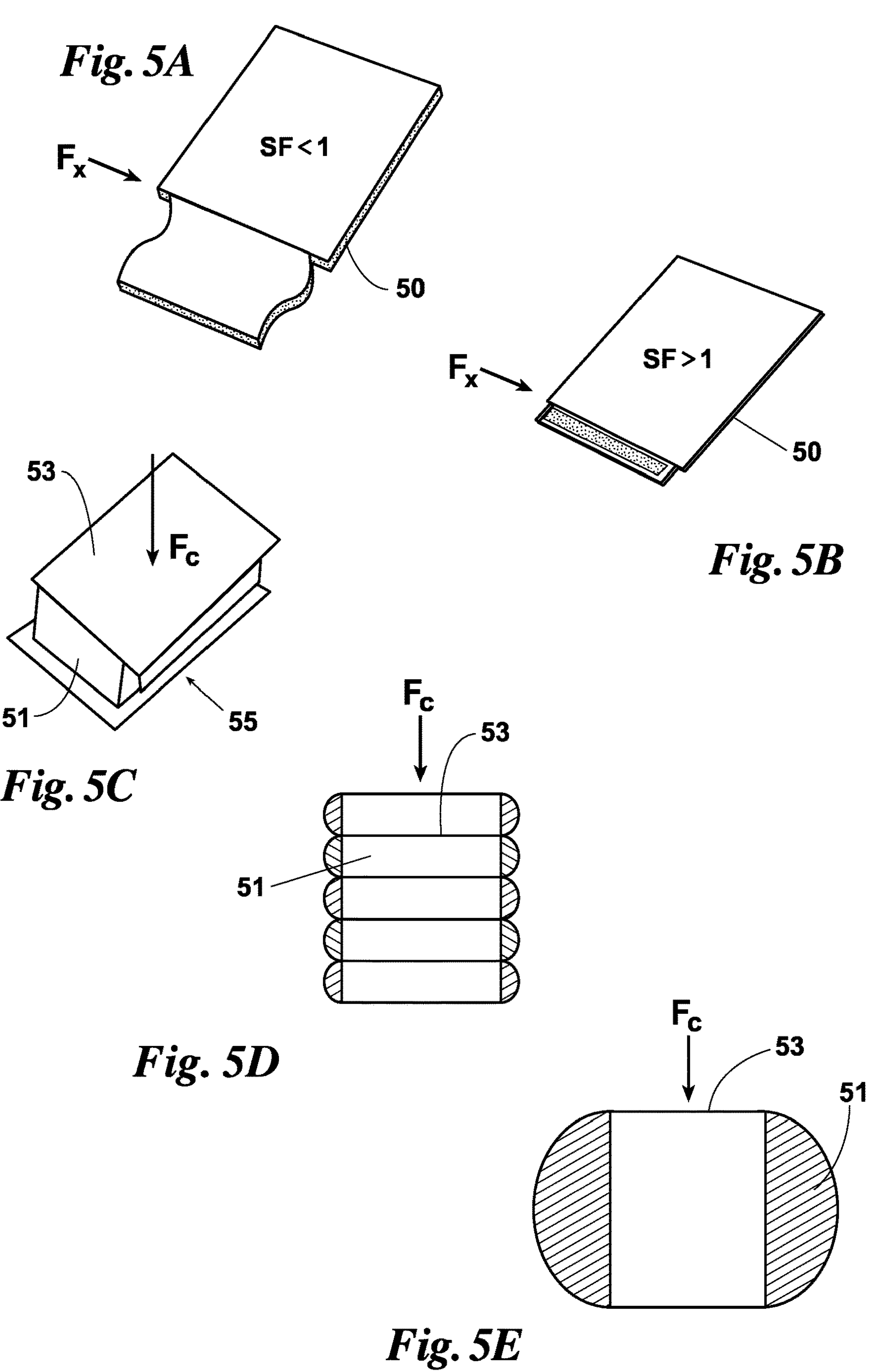

FIG. 4 is an example free body diagram which shows the resultant forces and bending moments as the tool is deployed into the pipeline and energized to set the seals.

FIGS. 5A to 5E illustrates different variants that can be achieved by changing the properties of the material used for the suppressor, by altering the shape factor (see e.g. FIGS. 5A & 5B) or by adding a stack of metals or man-made materials (see e.g. FIGS. 5C & 5D) to give additional rigidity to deal with high shear derived from elevated pressures within the pipeline. Providing a stack that includes alternating layers of elastomeric and non-elastomeric elements provides rigidity while permitting the elastomeric elements to balloon outward under compressive force. See e.g. FIGS. 5D & 5E.

Figure 6:
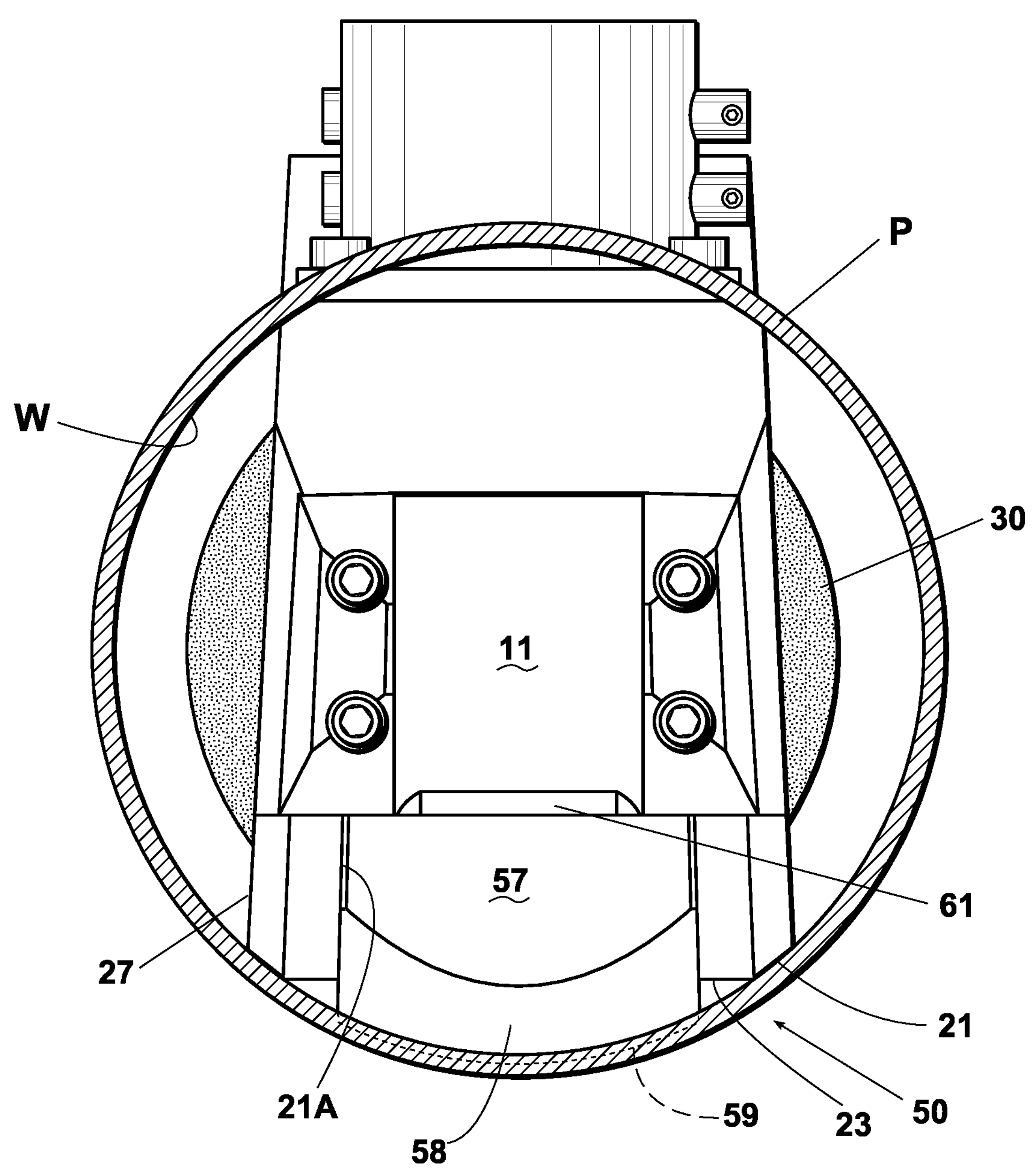

FIG. 6 is a front view of a plugging tool assembly including an embodiment of stress suppressor of this disclosure. A center arch section or bridge located between the two feet of the control bar head includes the elastomer. The bridge serves as the primary suppressor and contacts and matches a curvature of the pipe prior to contact by the feet, which serve as the secondary suppressor. As the bridge experiences more stress, the suppressor distributes the force to lower the force and subsequent stress experienced by the pipe wall.

Figures 7A, 7B, 7C:
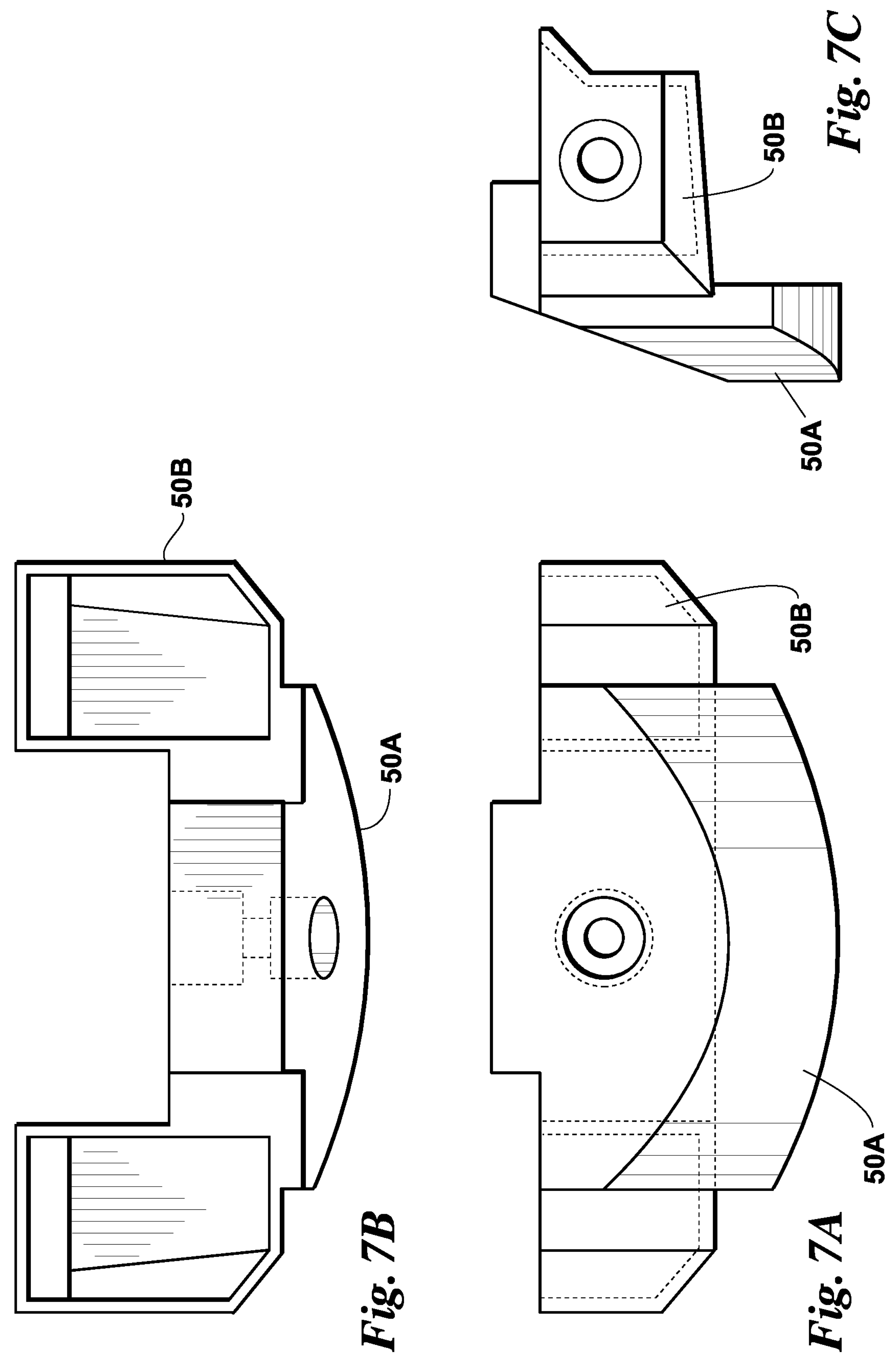

FIG. 7A is a front elevation view of an embodiment of a suppressor of this disclosure when not connected to a pipeline isolation tool. The suppressor is a two stage suppressor having a primary suppressor or zone (center arcuate portion) that comprises the first stage and comes into contact with the pipe wall first and a secondary suppressor or zone (left and right portions that comprises a the second stage and comes into contact with the pipe wall second. A fastener hole is provided for securing the suppressor to a control bar head.

FIG. 7B is a top plan view of the suppressor of FIG. 7A. The first stage or primary zone of the suppressor can lengthen in an axial direction of the pipe, the second stage or secondary zone of the suppressor can widen in a radial direction of the pipe.

FIG. 7C is an end view, the primary zone being to the left in this view. Each secondary zone also includes a fastener hole for securing the suppressor to the control bar head. The secondary zone, which may be in the form of legs or feet to each side of the primary zone, include curved lateral edges.

DETAILED DESCRIPTION

Embodiments of this disclosure make use of a stress suppressor in conjunction with a tool having sealing elements for plugging a section of pipeline as part of a hot tapping operation. The suppressor includes a compressive elastomer that serves as a mechanical means to distribute the loading of the tool and greatly reduce the overall force applied to the pipe wall during the insertion of the tool. For example, in a same, intrusive pipeline isolation application, the overall force applied to the pipe by an isolation tool equipped with a suppressor of this disclosure is at least 2 times less, 3 times less, or 4 times less than the overall force applied to the pipe by the same or similar isolation tool not having the suppressor. In many cases the overall force can be reduced by 4 to 14, 5 to 13, 6 to 12, 7 to 11, or 8 to 10 times that of a same or similar tool not having the suppressor, there being subranges within these broader ranges as well as discrete values. The use of the suppressor can, therefore, render a pipeline previously incapable of being safely serviced to one that can be safely serviced or modified as needed without issue or detriment to safety.

The safe distribution of the applied load can allow for increased use of weld fit type, two-part saddle type fittings that are not full encirclement such as but not limited to T. D. Williamson's SHORTSTOPP® Weld Fittings and 3-WAY™ tees. With prior art tools, in applications where thin wall steel pipe is involved, use of these types of fittings are typically avoided because a catastrophic type failure could occur, resulting in loss of primary containment.

Referring to the drawing figures, embodiments of a pipeline isolation or plugging tool 10 of this disclosure may be adapted for insertion into saddle branch fitting F to a lateral access opening A of a pipeline P, the access opening A typically made by way of a hot tap operation. The tool may include a nose end 11 having wheels 13, two sealing heads 30, 40 in pivotal relation to one another and to a control bar head 20 at a rearward end 15 of the tool 10. The control bar head 20 is connected to a control bar 19 at an upper end 19A of the control bar head 20 that is used to guide the tool 10 through the saddle branch fitting F as well as provide fluid needed to actuate grippers and sealing elements of the tool 10. The control bar head 20 may also include slide plates or guides 27. Each sealing head 30, 40 includes at least one seal or sealing element 35 and a plurality of support segments 36 located on one side of the sealing element 35. One of the heads 30, 40 may be the primary head, the other being the secondary head for use in a double block application.

The control bar head 20 rests within the pipeline P during the isolation, with its feet 21 contacting the pipeline wall W. In embodiments, each foot 21 of the control bar head 20 includes lateral edges 23 to ensure that concentrated loads are not realized or concentrated over small areas of the pipe wall W, potentially yielding the steel structure of the pipe P. The edges 23, which are beveled or angled, also allow for the attachment of an elastomeric element 51 of this disclosure, further reducing the amount of stress to the pipeline wall W as the sealing heads 30, 40 turn and enter the pipeline into a sealing position. The lateral edges 23 with the elastomeric element 51 attached may present a curved edge and allow the interacting surface of the control bar head 20 to the pipeline wall W to offer a greater surface area than that of the prior art.

To further reduce the stress to the pipeline wall W (and increase the distribution of stress to the pipeline P), the end 11 of the tool 10 may be machined to include suppressor 50 in the form of an elastomeric bridge 57 located between opposing sides 21A of the control bar feet 21. A strengthening gusset 61 supports the bridge 57, keeping the geometry from rolling in the direction of insertion and allowing an elastomer comprising the bridge 57 to shear in the direction of deployment. The lowermost end 58 of the bridge 57 is arched-shaped. The bridge 57 can serve as the primary suppressor or zone 50A, the legs or feet 21 serving as the secondary suppressor or zone 50B.

The leading edge 59 of the elastomer geometry of the suppressor 50 can be lengthened in a manner to ensure that the bridge 57 geometry comes into contact with the pipeline P first and compresses by a controlled dimension before the lateral edges 23 of the control bar head 20, which may also include an elastomeric element 51, begin to touch the pipeline wall W. This ensures that the bulk of the loading to the elastomer is noted in compression and shear. Knowing the points where the stress is to be controlled allows an engineer to design the stress suppressor 50 to ensure that thin wall pipe sees no yielding of the steel due to the mechanical advantage of the actuator that could be considered permanent. In embodiments, the primary suppressor or zone 50A lengthens in an axial direction of the pipe P and the secondary suppressor or zone 50B widens in a radial direction.

The stress suppressor 50 can be over-molded or created by a 3D printing process and comprise the primary suppressor or zone 50A and the secondary suppressor or zone 50B. The primary and secondary suppressors 50A, 50B may both be an elastomer. Depending on the magnitude of the stress, the suppressor 50 can also be created with different durometers to allow for control of the compression or spread rate of the elastomer with the loading. The suppressor 50 may also be molded or produced with multi-durometers to make the suppressor 50 more interactive with the pipeline wall. The suppressor 50 can also be made with thin plates 53 or stacks 55 such as metal, carbon fiber, fiberglass, filament reinforced, and the like, within the thickness of the elastomer 51 when additional rigidity is required. The elastomer 51 and plates 53 in the stack 53 are used to modify the shape factor which is intrinsically related to the strength of the suppressor 50, and the way in which the suppressor 50 will compress to interact with the interior wall of the pipeline while serving to reduce the overall shear displacement. This is especially relevant with higher pressures or larger loads which can create much higher shear loads across the suppressor 50.

In embodiments, an isolation or plugging tool 10 of this disclosure comprises a control bar head 20 including a suppressor 50 comprising a pair of spaced apart feet 21 and a bridge volume 60 defined in part by the spacing between the pair of feet 21, each foot 21 of the pair including curved lateral edges 23; a sealing head 30 pivotally connected to the control bar head 20; the stress suppressor 50 further including an elastomeric element 51 filling the bridge volume. In some embodiments, the elastomeric element 51 has a single durometer. In other embodiments, the elastomeric element 51 has a least two different durometers. In yet other embodiments, the suppressor 50 includes one or more elastomeric elements 51 and one or more non-elastomeric plates 53 arranged as a stack 55.

A method of use of an isolation or plugging tool 10 of this disclosure comprises lowering the plugging tool 10 into a lateral access connection A to a main pipe; rotating the sealing head 30, 40 into a position for sealing against an inner wall W of the main pipe P; and during at least a portion of the rotating, suppressing stress experienced by the inner wall W of the main pipe P by compressing an elastomeric element 51 surrounding a lower end portion 25 of the control bar head 20 as the elastomeric element 51 contacts the inner wall W.

In modeling conducted on a T. D. Williamson, Inc. low pressure PROSTOPP™ tool modified with a suppressor of this disclosure, FEA revealed the contact point below shows no stress over the normal stress caused by the pressure in the line. The small areas which do show some additional stress would be equal to roughly 8,000 psi. The pipe used in this case was of 35,000 psi yield, allowing the 8,000-psi realized to be less than one-fourth the allowable stress. In the case cited, the code would require a 0.5 design factor and the stress shown in this model is less than half that number for a successful capability. By comparison, an FEA of the same tool without the stress suppressor added stress above the yield strength, in a range of 38,000 to 40,000 psi.

While embodiments of a plugging tool have been described, the invention is defined by the following claims, the recited elements and limitations of which are entitled to their full range of equivalents.

The invention claimed is:

1. A plugging tool (10) adapted for insertion into a lateral access connection (A) to a pipe (P), the plugging tool including wheels (13) at a nose end (11), a control bar head (20) at a rearward end (15), and at least one sealing head (30, 40) pivotally connected to the control bar head, the at least one sealing head including a sealing element (35) and a plurality of support segments (36) located on one side of the sealing element;

the control bar head including an upper end (19A) connectable to a control bar and a primary and a secondary stress suppressor (50A, 50B) each located at a lower end (25) of the control bar head and each including a respective portion of an elastomeric element (51);

the secondary stress suppressor comprising a pair of spaced-apart legs (21) having feet with angled lateral edges (23), the pair of spaced-apart legs defining a bridge volume (60) therebetween oriented in an axial direction of the pipe, the angled lateral edges including the respective portion of the elastomeric element;

the primary stress suppressor comprising a bridge (57) located in the bridge volume, the bridge including the respective portion of the elastomeric element and unconstrained by the pair of spaced-apart legs in the axial direction of the pipe, the bridge further including an arch-shaped lowermost end (58) oriented in a circumferential direction of the pipe and extending downwardly past the feet.

2. The plugging tool of claim 1, wherein the respective portion of the elastomeric element of each of the primary and secondary stress suppressor is arranged to lengthen in the axial direction of the pipe when under an applied load and to widen in a radial direction of the pipe when under the applied load.

3. The plugging tool of claim 1, wherein a leading edge (59) of the arch-shaped lowermost end of the primary stress suppressor is configured to compress a predetermined dimension after contacting an inner wall (W) of the pipe before the lateral edges of the secondary stress suppressor contact the inner wall.

4. The plugging tool of claim 1, wherein the portion of the elastomeric element of the primary stress suppressor, the portion of the elastomeric element of the secondary stress suppressor, or the respective portion of the elastomeric element of each of the primary and secondary stress suppressor includes a dual durometer elastomeric element.

5. The plugging tool of claim 1, further comprising:

the primary or secondary stress suppressor, or both the primary and secondary stress suppressor, including at least one non-elastomeric element (53) arranged adjacent the respective portion of the elastomeric element.

6. The plugging tool of claim 5, wherein the at least one non-elastomeric element and the respective portion of the elastomeric element are arranged as a stack (55).

7. The plugging tool of claim 1, further comprising the bridge including a gusset (61) arranged to prevent the portion of the elastomeric element comprising the bridge from rolling in a direction of insertion into the pipe and allowing the elastomeric element to shear in a direction of deployment in the pipe.

8. A method for redistributing the applied force to an inner wall (W) of a pipe (P) during an isolation of the pipe, the method comprising:

lowering the plugging tool of claim 1 into a lateral access connection (A) to the pipe;

rotating the at least one sealing head into a position for sealing against the inner wall; and during at least a portion of the rotating, suppressing stress experienced by the inner wall by first compressing the portion of the elastomeric element of the primary stress suppressor against the inner wall and then compressing the portion of the elastomeric element of the secondary stress suppressor.

9. The method of claim 8, wherein the respective portion of the elastomeric element of each of the primary and secondary stress suppressor lengthens in an axial direction of the pipe and widens in a radial direction of the pipe when under an applied load.

10. The method of claim 8, wherein a leading edge (59) of the arch-shaped lowermost end of the primary stress suppressor is configured to compress a predetermined dimension after contacting the inner wall of the pipe before the lateral edges of the secondary stress suppressor contact the inner wall.

11. The method of claim 8, wherein the portion of the elastomeric element of the primary stress suppressor, the portion of the elastomeric element of the secondary stress suppressor, or the respective portion of the elastomeric element of each of the primary and secondary stress suppressor includes a dual durometer elastomeric element.

12. The method of claim 8, wherein the primary or secondary stress suppressor, or both the primary and secondary stress suppressor, includes at least one non-elastomeric element (53) arranged adjacent the respective portion of the elastomeric element.

13. The method of claim 12, wherein the at least one non-elastomeric element and the respective portion of the elastomeric element are arranged as a stack (55).

14. The method of claim 8, wherein the pipe has a predetermined yield strength, wherein during the rotating stress to the pipe is less than one-half the predetermined yield strength.

15. The method of claim 14, wherein during the at least a portion of the rotating, and when the plugging tool is in a sealing position, stress to the pipe is about one-quarter the predetermined yield strength.

* * * * *